United States Patent
Bürger

(10) Patent No.: US 9,534,159 B2
(45) Date of Patent: Jan. 3, 2017

(54) USE OF AN IONIC FLUOROPOLYMER AS ANTISTATIC COATING

(75) Inventor: Wolfgang Bürger, Burgrain (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 0 days.

(21) Appl. No.: 14/005,119

(22) PCT Filed: Mar. 13, 2012

(86) PCT No.: PCT/EP2012/001118
§ 371 (c)(1),
(2), (4) Date: Sep. 13, 2013

(87) PCT Pub. No.: WO2012/123103
PCT Pub. Date: Sep. 20, 2012

(65) Prior Publication Data
US 2014/0004333 A1    Jan. 2, 2014

(30) Foreign Application Priority Data
Mar. 15, 2011  (EP) .................................... 11002150

(51) Int. Cl.
*C09K 3/16* (2006.01)
*H01B 1/12* (2006.01)

(52) U.S. Cl.
CPC ............... *C09K 3/16* (2013.01); *H01B 1/122* (2013.01); *Y10T 428/249958* (2015.04); *Y10T 428/265* (2015.01); *Y10T 428/273* (2015.01); *Y10T 428/2967* (2015.01); *Y10T 428/3154* (2015.04); *Y10T 428/31544* (2015.04)

(58) Field of Classification Search
CPC ........................................................ C09K 3/16
See application file for complete search history.

(56) References Cited

U.S. PATENT DOCUMENTS

| | | | |
|---|---|---|---|
| 3,953,566 A | 4/1976 | Gore | |
| 4,194,041 A | 3/1980 | Gore et al. | |
| 4,598,011 A | 7/1986 | Bowman | |
| 4,954,388 A * | 9/1990 | Mallouk | B01D 69/10 204/295 |
| 5,476,589 A | 12/1995 | Bacino | |
| 6,254,978 B1 * | 7/2001 | Bahar et al. | 428/305.5 |
| 7,094,851 B2 | 8/2006 | Wu et al. | |
| 2003/0139521 A1 * | 7/2003 | Linert et al. | 524/507 |
| 2004/0121210 A1 | 6/2004 | Hamrock et al. | |
| 2011/0165406 A1 * | 7/2011 | Burger et al. | 428/306.6 |

FOREIGN PATENT DOCUMENTS

| | | |
|---|---|---|
| EP | 2145916 | 1/2010 |
| JP | 62-254314 | 11/1987 |
| WO | WO 90/15828 | 12/1990 |
| WO | WO95/14132 | 5/1995 |
| WO | WO 96/07529 | 3/1996 |
| WO | WO2006/127946 | 3/2007 |
| WO | WO2010/006783 | 1/2010 |
| WO | WO2010/006784 | 1/2010 |

* cited by examiner

*Primary Examiner* — Hai Vo
(74) *Attorney, Agent, or Firm* — Amy L. Miller

(57) ABSTRACT

The present invention relates to the use of an ionic fluoropolymer in its H-form for the formation of an antistatic coating on a non-conductive substrate, and to a cable comprising an outermost non-conductive layer with a coating thereon which comprises an ionic fluoropolymer in its H-form.

15 Claims, 1 Drawing Sheet

USE OF AN IONIC FLUOROPOLYMER AS ANTISTATIC COATING

Figure 1A:
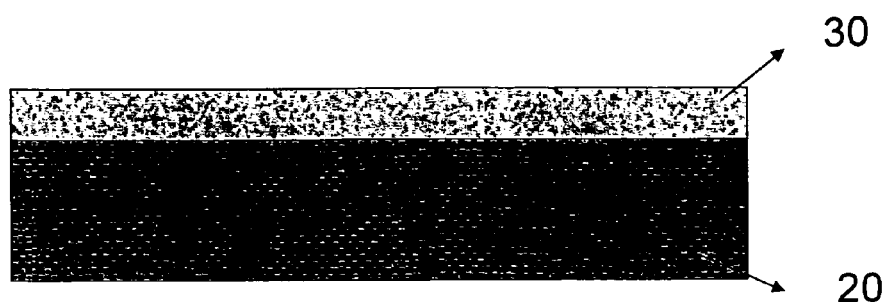

The invention relates to the use of an ionic fluoropolymer in its H-form (protonic) for the formation of an antistatic coating on a non-conductive substrate, and to a cable comprising such an antistatic coating on its outermost layer.

Non-conductive surfaces, such as fluoropolymer surfaces, are prone to build up electric charge, for example due to the influence of friction or electrical fields. The charges are stored on the surface and may discharge under certain conditions, thus leading to adverse effects on material, persons or environment. A well-known method of preventing the built-up of electric charges on a surface is to provide the non-conductive surface with an antistatic coating which reduces the surface resistance.

In known antistatic coatings, additives such as carbon black or other modifications of conducting carbon are used for reducing the surface resistance. The conductive materials may be added to the material, the non-conductive surface is made of as a filler, or may be applied in a coating process onto the surface.

For example, in WO 2006/127946 A2 it is suggested to use carbon particles for antistatic coatings of extended polytetrafluoroethylene membranes.

Instead of carbon, also metals and conductive polymers are used as antistatics in fillers or in coatings. Metals may also be coated (applied) onto the surface by vaporization or sputtering processes.

These known processes for imparting antistatic properties to surfaces have the disadvantage that the adhesion of the conductive material, e.g. carbon or metal, on the surface is usually of a very low degree so that undesired abrasion of particles of these materials often occurs. Due to the easy abrasion of the conductive material, the level of the antistatic properties of the treated surfaces decreases over time.

Furthermore, in particular in clean rooms, the emission of particles is a crucial problem. Thus, the known means of imparting antistatic properties to surfaces do not only have the disadvantage that the antistatic properties decrease over time, but also that additional particles are created in the clean room which have to be removed.

In addition, many of the organic and inorganic salts, polymeric electrolytes, and low molecular weight surfactants typically used in antistatic coatings can be leached out during use, resulting in a loss of antistatic performance.

It is therefore an object of the present invention to provide a coating for non-conductive substrates which imparts durable antistatic properties to said substrates. The coating should exhibit a good level of adhesion to the substrate, should be easy to produce and to apply, and should form an even and homogeneous layer when spread on the substrate.

Furthermore, it is an object of the present invention to provide said coating that is highly resistant to abrasion and does not release particles into its environment so that coated articles such as cables can e.g. be used under clean room conditions.

Moreover, in the case of porous substrates, such as e.g. microporous polytetrafluoroethylene (PTFE) membranes, the coating should not impair the fluid flow through the pores.

It has now surprisingly been found that these objects can be achieved by forming a coating on a non-conductive substrate which comprises or consists of an ionic fluoropolymer, i.e. a fluorinated polymer which comprises ionic groups, in its H-form.

The present invention therefore provides the use of an ionic fluoropolymer in its H-form for the formation of an antistatic coating on a non-conductive substrate.

The invention allows to provide the surface of a non-conductive substrate with an antistatic coating which is homogeneous and has excellent adhesion and film forming properties, especially in the case of fluoropolymeric substrates, such as made of polytetrafluoroethylene (PTFE) and expanded PTFE. Thus, the coating exhibits high abrasion resistance so that the antistatic properties of the substrate are retained even under stress conditions.

Furthermore, for coatings of the inner pore surface of (micro-)porous substrates, it is advantageous that the coatings of the invention are formed smoothly and evenly so that pores are not blocked. This advantage is especially important compared to prior art concepts which have used small particles in order to modify properties of the substrate. The advantage of the invention is represented in high flow-through rates for air and liquids for porous materials. For monolithic coatings, i.e. layers on the outer surface of a substrate, the absence of particulates allows the formation of ultra-thin coatings.

In addition, as the coating does not contain particles and does not release any such particles into the environment, the coating is appropriate for use under clean-room conditions.

The substrate may be any non-conducting substrate on which a coating can be applied. Non-conducting substrates usually have a specific surface resistance higher than $10^9$ Ohm/square at 23° C. and 50% relative humidity.

The substrate may comprise an organic or an inorganic material, such as synthetic and/or natural polymers, and composites of synthetic and/or natural polymers, and may include fillers.

The substrate can be a membrane, a textile or a laminate. The substrate may be woven, non-woven, felt or knit. The substrate may also consist of fibres, such as monofilaments, multifilaments, or yarns, including microdenier fibers and yarns.

The substrate can be a dielectric substrate.

In one embodiment of the use of the present invention, the coated substrate has a surface resistance of $10^9$ Ohm/square or below, in a further embodiment $10^8$ Ohm/square or below, and in yet another embodiment $10^7$ Ohm/square or below. Usually, the coated substrate has a surface resistance of $10^4$ Ohm/square, or more, and below $10^9$ Ohm/square.

These values for the surface resistance of the coated substrate relate to the coated substrate before subjected to stress/wear.

In one embodiment of the use of the present invention, the surface resistance of the uncoated substrate is reduced by the antistatic coating by a factor of at least $10^2$, in a further embodiment by a factor of at least $10^3$, in yet another embodiment by a factor of at least $10^4$.

For example, the surface resistance of PTFE usually is $>10^{12}$ Ohm/square and may be reduced by the use of the antistatic coating to values of $10^7$ Ohm/square or even below, corresponding to a factor of $10^5$ or even higher.

The charge decay time (CDT), measured according DIN EN 1149-3, describes the antistatic performance of an article. For coated substrates according to the use of this invention, the CDT in one embodiment is below 2 s, in a further embodiment is below 1 s, in still a further embodiment is below 0.5 s, and in yet another embodiment is below 0.01 s at 20% relative humidity.

In one embodiment of the present invention, the laydown of the coating on the substrate ranges from 0.1 to 10 g/m² based on the outer surface of the substrate, in a further embodiment it ranges from 0.2 to 8 g/m².

For example, the lowest laydown for a monolithic coating on ePTFE starts usually at 0.3 g/m² on a membrane.

In one embodiment, the non-conductive substrate in the use of the present invention comprises, or consists of, a polymeric substrate. In this embodiment, the polymeric substrate may be any kind of polymer, such as synthetic, natural polymers and/or composites of synthetic and/or natural polymers.

Polymeric substrates are known to exhibit low surface energy, in contrast e.g. to metals or metal oxides. The polymeric substrate of the article of the invention in one embodiment has a surface energy of 100 mN/m or less, and in a further embodiment has a surface energy of 40 mN/m or less.

The substrate on which the coating is present in one embodiment has a thickness of 0.1 to 10,000 micrometer, in a further embodiment has a thickness of 1 to 1,000 micrometer, and in yet another embodiment has a thickness of 3 to 100 micrometer.

In one embodiment, the non-conductive substrate in the use of the present invention comprises, or consists of, a fluoropolymer, i.e. a polymer which contains fluorine atoms, and in a further embodiment, the substrate is a fluoropolyolefin.

The fluoropolymer may be partially fluorinated, or fully fluorinated, i.e. perfluorinated.

In a further embodiment, the substrate comprises, or consists of, polytetrafluoroethylene (PTFE), a modified PTFE, a fluorothermoplastic or a fluoroelastomer or any combination of these materials. The term "modified PTFE", as used herein, is intended to denote a type of tetrafluoroethylene copolymer in which, in addition to tetrafluoroethylene monomer units, further perfluorinated, fluorinated or non-fluorinated co-monomer units are present.

In still a further embodiment, the substrate comprises polytetrafluoroethylene (PTFE), and in yet another embodiment, the substrate consists of PTFE.

The substrate furthermore may be a porous substrate, for example porous PTFE.

The term "porous", as used herein, refers to a material which has voids throughout the internal structure which form an interconnected continuous air path from one surface to the other.

The substrate may be a microporous substrate. This means that the voids of the substrate are very small and are usually referred to as being "microscopic".

A suitable pore size of the voids in the microporous substrate is in the range of 0.01 to 15 micrometer, as determined in the mean flow pore size measurement.

In one embodiment, the substrate comprises, or consists of, expanded PTFE (ePTFE, EPTFE).

PTFE may be expanded (i.e., drawn) in one or more directions to render the fluoropolymer porous. The porous fluoropolymer can be in the form of a tape, tube, fiber, sheet or membrane. The microstructure of the porous fluoropolymer can include nodes and fibrils, only fibrils, only fibril strands or bundles, or stretched nodes interconnected by fibrils.

Suitable fluoropolymer membranes include uni- or biaxially stretched polytetrafluoroethylene membranes.

A suitable expanded polytetrafluoroethylene (ePTFE) material are, e.g., the non-woven ePTFE films disclosed by Bowman in U.S. Pat. No. 4,598,011, by Branca in WO 96/07529, by Bacino in U.S. Pat. No. 5,476,589, by Gore in U.S. Pat. No. 4,194,041 and by Gore in U.S. Pat. No. 3,953,566, the contents of which are incorporated herein by reference. The ePTFE films described therein are thin, strong, chemically inert and intrinsically can have a high flow-through rate for air, moisture or liquids.

Suitable fluoropolymers for making ePTFE films or composites include PTFE and copolymers of tetrafluoroethylene, like FEP (fluorinated ethylene propylene copolymer), PFA (perfluoroalkoxy, perfluoroalkyl vinyl ether) THV (tetrafluoroethylene hexafluoropropylene vinylidene fluoride terpolymer) etc.

The combination of the mean flow pore size and thickness determines the flow rates through the membranes. For microfiltration applications, an appropriate flow rate is required, together with good particle retention performance. A narrow ePTFE pore size leads to high water entry pressures. A larger ePTFE pore size would decrease the resistance of an ePTFE membrane to water entry. For these practical reasons, a mean flow pore size of ePTFE below 0.3 micrometer is regarded as being favorable.

The term "ionic fluoropolymer" is intended to denote an organic polymer having ionizable groups, i.e. groups which are ionizable through the abstraction or the attachment of a proton, and which upon ionization bear an electric charge. The ionizable groups in their ionized state may be anionic or cationic groups, such as $-SO_3^-$, $-COO^-$, $-PO_4^{2-}$, or $-NH_3^+$ and derivatives thereof.

In the use of the present invention, the ionic fluoropolymer is in its H-form, which is intended to denote that the ionizable groups are not in their ionized state but are neutral, and that the ionic charges which may be present upon ionization are counterbalanced by H-atoms.

This means for anionic groups that the negative charges are balanced by protons so that the ionizable groups bear no charge, e.g. $-SO_3H$, $-COOH$, or $-PO_4H_2$, and for cationic groups that no charge-unbalanced protons or other positively charged species are present so that, again, the ionizable groups bear no charge, e.g $-NH_2$.

In one embodiment, the ionizable groups in their ionized state are anionic groups, and in a further embodiment, the groups are selected from carboxylic, phosphoric, sulphonic groups and mixtures thereof.

Furthermore, in the ionic fluoropolymer, fluorine atoms are present which are covalently bonded to carbon atoms in the polymer main or side chains (branches).

The term "organic polymer" includes homopolymers, copolymers, such as for example, block, graft, random and alternating copolymers as well as terpolymers, further including their derivatives, combinations and blends thereof. Furthermore, unless specifically limited, the term "polymer" shall include all geometrical configurations of the molecule, including linear, block, graft, random, alternating, branched structures, and combination thereof as regards both embodiments.

In one embodiment, the ionic fluoropolymer has a high fluorine content, e.g. >50 atom % with respect to the non-carbon atoms, in order to improve the compatibility to the substrate, especially to fluorinated substrates such as PTFE.

In one embodiment, the fluorine/hydrogen ratio, in the following F/H ratio, of the ionic fluoropolymer is above 1, in a further embodiment it is above 2, and in still a further embodiment it is above 3, as the compatibility with substrates, in particular fluorinated polymers, is further improved and the solubility in water is kept at a low level. Additionally, the durability of the coating is enhanced.

The F/H ratio determines the degree of swelling at moderate or high relative humidity. The higher the F/H ratio, the lower the degree of swelling under humid conditions.

In one embodiment, the ionic fluoropolymers are perfluorinated, in particular in the case of using them with fluorinated substrates, such as PTFE or ePTFE substrates.

The equivalent weight of an ionic fluoropolymer is defined to be the molecular weight of the ionic fluoropolymer divided by the number of ionizable groups present in the ionic fluoropolymer.

The equivalent weight of the ionic fluoropolymer in one embodiment ranges from 400 to 15,000 g/mol, in a further embodiment it ranges from 500 to 10,000 g/mol, in still a further embodiment it ranges from 500 to 8,000 g/mol, in still a further embodiment it ranges from 500 to 2,000 g/mol, and in yet another embodiment it ranges from 700 to 2,000 g/mol.

If the equivalent weight is too low, the solubility in water will be too high. If the equivalent weight is too high, the processing and antistatic performance properties will be deteriorated.

In one embodiment, the ionic fluoropolymer is not water-soluble.

In one embodiment of the invention, the ionic fluoropolymer is either a fluoroionomer or an ionic fluoropolyether.

The term "fluoroionomer" is intended to denote a copolymer of partially or perfluorinated alpha olefins, such as $H_2C$=CHF (vinyl fluoride), $H_2C$=$CF_2$ VDF (vinylidene fluoride), HFC=CHF, $F_2C$=$CF_2$ (tetrafluoroethylene), $F_2C$=$CFCF_3$, ClFC=$CF_2$ chlorotrifluoroethylene, with partially or perfluorinated vinyl ethers. The copolymer furthermore contains ionizable groups. The fluoroionomer may also include non-fluorinated comonomers, such as acetylene.

The fluoroionomer may comprise side chains which may be linked to the polymer by an ether group. The side chain length can vary from 3 carbon atoms to 8 carbon atoms including ether links. Then, the ionizable groups may be bonded to the side chains.

Commercial ionomers are available from DuPont (DuPont™ Nafion®), Asahi Glass Co. Ltd. (Flemion®), 3M-Dyneon (US patent publication no. 2004/0121210 A1), Asahi Kasei (Aciplex®), Dow Chemical (Dow 808 EW ionomer), Solvay Solexis (Aquivion™ PFSA) and Shanghai GORE 3F (GORE SELECT® U.S. Pat. No. 7,094,851).

The structure of Nafion®, Aciplex® and Flemion® is as follows:

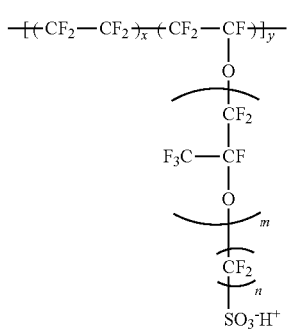

Nafion®: m ≥ 1, n = 2
x = 5-13.5, y = 1000

Aciplex®: m = 0-3, n= 2-5
x = 1.5-14

Flemion®: m = 0 or 1, n = 1-5

Aquivion™ D83 PFSA Dispersions are based on the copolymer of tetrafluoroethylene and a sulfonyl fluoride vinyl ether (SFVE) $F_2C$=CF—O—$CF_2$—$CF_2$—$SO_2F$.

The term "ionic fluoropolyether" is intended to denote a polymer made from partially or perfluorinated olefinic monomer units linked by O atoms and units containing ionizable groups. In the ionic fluoropolyether molecules, one or more ionizable groups of the same or a different nature may be present.

Ionic fluoropolyethers typically are thermally stable, substantially insoluble in water and most common solvents, and should not be leached out after a coating application.

For example, the fluoropolyether olefinic monomer units may comprise —O—($CF_2$—$CF_2$)—, and/or —O—(CFH—$CF_2$)—, and/or —O—($CH_2$—$CF_2$)—, and/or —O—($CH_2$—CHF)—, and/or —O—(CF($CH_3$)—$CF_2$)—, and/or —O—(C($CH_3$)$_2$—$CF_2$)—, and/or —O—($CH_2$—CH($CH_3$))—, and/or —O—(CF($CF_3$)—$CF_2$)—, and/or —O—(C($CF_3$)$_2$—$CF_2$)—, and/or —O—($CF_2$—CH($CF_3$))—.

The ionizable groups may in their ionized state be anionic groups, such as —$SO_3^-$, —$COO^-$, —$OPO_3^{2-}$, and/or combinations of anionic and cationic groups, such as —$SO_3^-$, —$COO^-$, —$OPO_3^{2-}$, with —$NH_3^+$, —$NR_1H_2^+$ or —$NR_2H^+$.

In one embodiment, the ionizable groups in their ionized state are anionic groups, and in a further embodiment the groups are selected from carboxylic, phosphoric, sulphonic groups and mixtures thereof.

In the ionic fluoropolyether, fluorine atoms are present, which are covalently bonded to carbon atoms in the polymer main or side chains (branches). The term "polymer" includes copolymers, such as for example, block, graft, random and alternating copolymers as well as terpolymers, further including their derivatives, combinations and blends thereof. Furthermore, unless specifically limited, the term "polymer" shall include all geometrical configurations of the molecule, including linear, block, graft, random, alternating, branched structures, and combination thereof.

Ionic perfluorinated polyethers usually have olefinic monomer units selected from any one of or combination of the following: —$CF_2$—O—; —($CF_2CF_2$)—O—; —(CF($CF_3$))—O—; —($CF_2CF_2CF_2$)—O—; —($CF_2CF(CF_3)$)—O—; and —(CF($CF_3$)$CF_2$)—O—. Some newer types of perfluorinated polyethers may also contain other repeating units (e.g. (C($CF_3$)$_2$)—O—) or such with more than three carbon atoms: e.g. —($C_4F_8$)—O—; or —($C_6F_{12}$)—O—.

In the present invention, in one embodiment at least 25% of the ionizable groups of the total ionic fluoropolymer present in the antistatic coating are in their H-form, in a further embodiment at least 45% of the ionizable groups of the total ionic fluoropolymer present in the antistatic coating are in their H-form, in still a further embodiment at least 50% of the ionizable groups of the total ionic fluoropolymer present in the antistatic coating are in their H-form, in a still further embodiment at least 75% of the ionizable groups of the total ionic fluoropolymer present in the antistatic coating are in their H-form, and yet another embodiment all ionizable groups of the total ionic fluoropolymer present in the antistatic coating are in their H-form.

In one embodiment, the antistatic coating comprises at least 50 wt. % of ionic fluoropolymer, in a further embodiment the antistatic coating comprises at least 75 wt. % of ionic fluoropolymer, and in still a further embodiment the antistatic coating consists of ionic fluoropolymer.

The coating in the present invention may be an "outer coating", i.e. a coating which is present as a substantially continuous layer ("monolithic coating"), or a discontinous e.g. dot-like pattern on an outer surface of the substrate, and/or an "inner coating", i.e. a coating present on the inner and outer surface of the pores of a porous substrate, but not occluding them.

The coating may also completely fill the pores of the porous substrate, i.e. the coating may be fully imbibed in the substrate, thus occluding the pores.

An outer, e.g. monolithic, coating may be present on one side or on both sides of a substrate.

A monolithic coating may also form
a) an intermediate layer between two substrates, e.g. two microporous membranes or one microporous membrane and one textile layer, or
b) part of a multicoated layer on a substrate, e.g. one layer between two other coatings or the topcoating at the most outer surface.

FIG. 1a shows a schematic drawing of a monolithic coating 30 in the form of a layer on an outer surface a substrate 20.

As a monolithic coating is usually airtight, in case of a porous substrate, air flow through the coated article will be prevented by a monolithic coating. The expressions "airtight layer" and "prevention of airflow" refer to the fact that no airflow is observed for at least two minues as determined by the Gurley test described in the experimental part.

The thickness of the final coating for monolithic coatings in one embodiment is in the range of 0.05 to 25 micrometer. Within this range, a skilled person will be able to find the most suitable thickness depending on the intended use.

If the coating is thinner than 0.05 micrometer the durability of the coating will be of a low degree.

Laydown and coating thickness will affect the durability and should be adjusted depending on the intended use.

The breathability or moisture vapour transport rate of monolithic coated porous substrates, such as ePTFE films, is characterized by the MVTR (moisture vapor transmission rate) value. Typically, the MVTR of a substrate, in particular an ePTFE substrate, with a monolithic coating on the porous membrane will be above 10,000 g/m$^2$ 24 h. In one embodiment, the MVTR is adjusted to be above 25,000 g/m$^2$ 24 h, and in a further embodiment, the MVTR is above 40,000 g/m$^2$ 24 h.

The MVTR of the coated substrate in the invention remains high at low relative humidity.

Figure 1B:
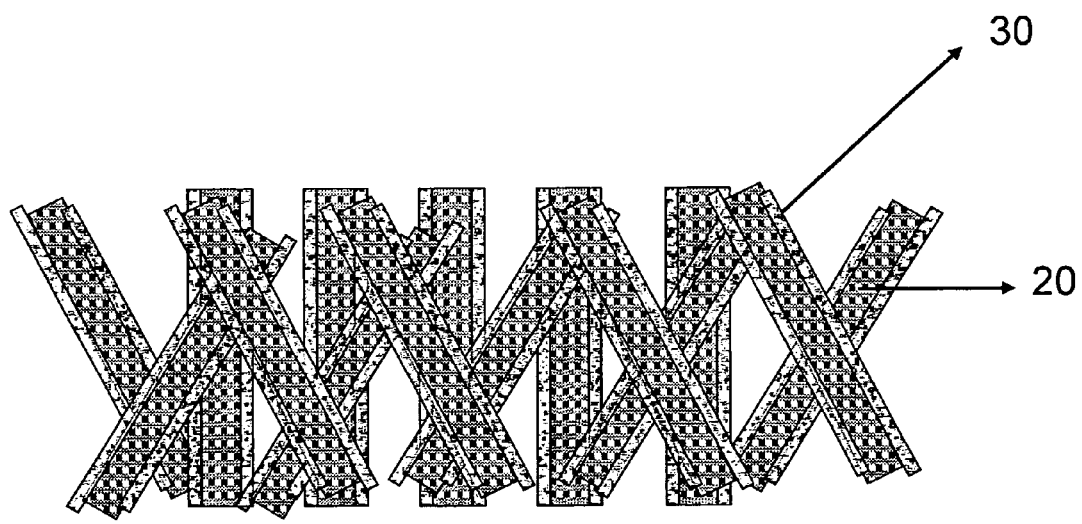

A schematic drawing of an inner coating present on the inner and outer surface of the pores 20 on a porous substrate 30 is shown in FIG. 1b.

Such an inner coating is present in the form of an air-permeable coating, i.e. on the inner and outer surface of the pores of the substrate, however, without sealing the pores.

The inner coating produces an air-permeable porous substrate after coating, provided, of course, that no additional monolithic coating is applied to the substrate which prevents air flow. With the term "air permeability" it is referred to the observation of a certain volume of air that flows through a defined area of material, as determined by the Gurley test described below. Inner coatings allow the construction of air-permeable lattice structures with antistatic surface, particularly on microporous substrates such as thin membranes, for example.

In the present invention, in one embodiment the coated substrate is permeable to air, i.e. it has a Gurley number<100 s.

The thickness of an inner coating in one embodiment is above 0.05 micrometer.

Inner coatings may be applied to ultra-thin substrates below a thickness of 500 nanometer and may also be applied to ultra-thin substrates below a thickness of 250 nanometer.

Inner coatings may furthermore be applied for the coating of microporous membranes, such as ePTFE. For an inner coating, the mean flow pore size of ePTFE may be between 0.01 micrometer and 15 micrometer, in a further embodiment may be between 0.05 micrometer and 10.0 micrometer.

In another embodiment, the coating is formed on a porous substrate such that all pores are completely filled, i.e. fully imbibed, with the coating material, and hence the pores are sealed.

Fully imbibed coatings are mainly applied in ultra-thin substrates. Thus, a fully imbibed coating may be applied to a substrate with a thickness of 25 micrometer or below, or may be applied to a substrate with a thickness of 15 micrometer or below. Thicker constructions can be made by layering these fully imbibed articles.

Of course, one or more monolithic coatings on the one hand, and inner coatings or fully imbibed coatings on the other hand, may be applied a) simultaneously and/or b) incrementally to a substrate. For example, a porous substrate may have a monolithic coating on at least one outer surfaces and an inner coating within the pores.

The antistatic coating of the use of the present invention may be produced by applying the ionic fluoropolymer in liquid form onto the substrate (coating liquid).

The ionic fluoropolymer can be liquid either due to being a liquid as such, or because it has been dissolved, emulsified or dispersed in a solvent.

The coating liquid to be applied onto the substrate in one embodiment has a viscosity larger than 50 mPas, in a further embodiment has a viscosity larger than 60 mPas, and in still a further embodiment has a viscosity larger than 70 mPas at 25° C.

The coating liquid comprising the ionic fluoropolymer may have a surface tension lower than ca. 35 mN/m, or may have a surface tension lower than 30 mN/m, or may even may have a surface tension lower than 20 mN/m.

Such low surface tensions of the ionic fluoropolymer formulations are helpful for coating substrates, particularly fluoropolymers such as PTFE, which exhibit a very little surface energy.

The ionic fluoropolymer may be present in the coating liquid in a concentration of from 10 wt. % solids to 0.1 wt. % solids, in a further embodiment may be present in a concentration of from 5 wt. % solids to 0.5 wt. % solids.

After application of the coating liquid, the coated substrate may be heated to a temperature of 100 to 200° C., in a further embodiment may be heated to 150 to 190° C., and in still a further embodiment may be heated to 160 to 180° C.

In one embodiment of the present invention, the coated substrate is present in a garment, as for example in garments for protection, comfort and functionality, a textile structure, laminate, filter element such as for the filtration or microfiltration of liquids and/or gases, a venting element such as for the venting of vessels and containers, a sensor, a diagnostic device, a protective enclosure, or a separation element.

For example, an air-permeable antistatic coating on substrates produces articles which can be used as static protective workwear, or in air filtration or venting applications in order to prevent charge built-up.

The present invention also relates to a cable comprising an outermost non-conductive layer with a coating thereon which comprises an ionic fluoropolymer in its H-form.

In further embodiments of the cable of the invention, the outermost non-conductive layer may be one according to any of the embodiments described hereinabove for the non-conductive substrate.

In still further embodiments of the cable of the invention, the coating may be one according to any of the embodiments described hereinabove and/or may be formed one according to any of the embodiments described hereinabove.

In one embodiment of the present invention, the cable is a flat cable.

The present invention will be further illustrated by the examples described below, and by reference to the following figures:

FIG. 1a: Schematic sectional view of an article (10) having a polymer porous substrate (20) and a monolithic coating (30) thereon.

FIG. 1b: Schematic sectional view of an article (10) having a polymer porous substrate (20) and a coating (30) thereon, which is present on the inner and outer surface of the pores ("inner coating").

METHODS AND EXAMPLES a) Charge Decay Time (CDT)

Charge decay time (CDT) was measured in accordance with DIN EN 1149-3.

b) Surface Resistivity

Surface resistivity was measured in accordance with ASTM D 257 between two parallel electrodes with a square configuration.

The control of environmental factors is important, since the surface restivity of a non-conductive polymeric substrate can change rapidly in response to humidity change. The accurate reporting of test results included the temperature and humidity of the samples before and during the surface resistivity measurement.

c) Gurley Numbers

Gurley numbers [s] were determined using a Gurley Densometer in accordance with ASTM D 726-58.

The results are reported in terms of Gurley Number, which is the time in seconds for 100 cubic centimeters of air to pass through 6.54 cm$^2$ of a test sample at a pressure drop of 1.215 kN/m$^2$ of water.

d) Frazier Numbers

Frazier numbers [cfm] were determined using an Air Permeability Tester III FX 3300 (TEXTEST AG) in accordance with ASTM D 737.

e) Mean Flow Pore Size [MFP, micrometer]

MFP was measured using a PMI (Porous Materials Inc.) Capillary Flow Porometer CFP 1500 AEXLS. The membrane was completely wetted with Silwick (surface tension 20 mN/m). The fully wetted sample is placed in the sample chamber. The chamber is sealed, and gas is allowed to flow into the chamber behind the sample to a value of pressure sufficient to overcome the capillary action of the fluid in the pore of the largest diameter. This is the Bubble Point Pressure. The pressure is further increased in small increments, resulting in flow that is measured until the pores are empty of fluid. The applied pressure range was between 0 and 8.5 bar. Beside mean flow pore diameter, the largest and smallest pore diameters were detected.

f) Thickness

For the substrate film thickness measurements reported herein, measurements were made using a Heidenhain thickness tester.

Microscopic pictures were taken on LEO 1450 VP, samples were sputtered with gold. Cross-sections were prepared and thicknesses were measured.

g) Flex Test

A GORE® High Flex Cable was fixed in an energy chain and flexed 1,000,000 cycles in the rolling flex test at room temperature.

Traverse path: 1.30 m
Velocity: 30 cycles/min
Bend radius: 60 mm
Surface resistance was measured before and after the test.

f) Temperature/Humidity Test

In accordance with IEC (International Electrotechnical Commission) -68-2-30 Damp Heat, the humidity test was performed at the temperature range 25° C. to 55° C. and 92 to 98% relative humidity for a total of 6 cycles.

A dry heat test was performed in accordance with IEC 68-2-2 at 110° C. for 7 days.

EXAMPLES

Example 1

The following example illustrates the advantage of ionic fluoropolymers in its H-form for the formation of antistatic coatings.

An ePTFE membrane (area weight 20.5 g/m$^2$, Gurley 11.6 s, surface resistance>10$^{12}$ Ohm/square) was dipped in a mixture of 133.3 g Flemion F 950 in ethanol (6.0% solids, Ionomer, AGC), 216.7 g ethanol and 50 g water at 16° C. for 30 s.

After drying at 160° C. for 5 min, the membrane was permeable to air (Frazier number 0.37) and showed a surface resistance of 2.55·10$^6$ Ohm/square at 65% rh and 21° C.

Example 2

New commercial ionomers in water/alcohol dispersions with shorter side chain perform well to achieve antistatic surface properties on membranes.

50 g Aquivion™ hydroalcoholic Ionomer dispersion D83-15C (Solvay Solexis) was diluted with 300 g isopropylalcohol and 30 g water stirring constantly at 17° C. (measured solids 1.97% by weight).

An ePTFE membrane (area weight 21.1 g/m$^2$, Frazier 0.32, surface resistance>10$^{12}$ Ohm/square) was coated with the solution D83-15C for 30 s. The lay down was 4.05 g/m$^2$ after drying at 165° C. and 5 min. The surface resistance of the coated membrane was reduced to 1.367·10$^7$ Ohm/square at 65% rh and 21° C.

Example 3

Another ePTFE membrane (area weight 54.8 g/m$^2$, Frazier 0.35, surface resistance>10$^{12}$ Ohm/square) was coated with the solution of Example 2 for 30 s. The lay down was 2.1 g/m$^2$ after drying at 165° C. and 5 min. A surface resistivity of the coated membrane of 1.80·10$^7$ Ohm/square was measured at 65% rh and 21° C.

Example 4

50 g Aquivion™ aqeuous Ionomer dispersion D83-20B (Solvay Solexis) was mixed with 450 g ethanol stirring constantly at 16° C. (measured solids 2.0% by weight).

An ePTFE membrane (area weight 21.1 g/m$^2$, Frazier 0.32, surface resistance>10$^{12}$ Ohm/square) was coated with the solution D83-20B for 30 s. The lay down was 5.43 g/m² after drying at 165° C. and 5 min. The surface resistivity of the coated membrane of 2.067·10⁷ Ohm/square was measured at 65% rh and 21° C.

Example 5

Another ePTFE membrane (area weight 54.8 g/m², Frazier 0.35, surface resistance>$10^{12}$ Ohm/square) was coated with the solution of Example 4 for 30 s. The lay down was 5.82 g/m² after drying at 165° C. and 5 min.

Surface resistivity of 2.633·10⁷ Ohm/square was measured at 65% rh and 21° C.

Examples 3 to 5 describe the process to achieve antistatic properties at a variety of ePTFE membranes using a broad range of formulations.

Example 6

The surface resistance of a non-air permeable Flemion F 950 (FSS-1, AGC) film (thickness 28 μm) was 3.60·10⁵ Ohm/square measured at 21° C. and 55% relative humidity.

The surface resistance of a nonair permeable GORE-SELECT® 55 series (W.L. Gore & Associates, Inc.) film (thickness 26 μm) was 1.93·10⁵ Ohm/square measured at 21° C. and 55% relative humidity.

Charge decay time results of less than 0.01 s at 20% rh indicate antistatic properties for both pure ionomeric films.

Example 6 shows inherent antistatic properties of free standing films of ionic fluoropolymers in its H form.

Example 7

The following example illustrates the performance of ionic fluoropolymers partially in its H-form (50% of total number) for the formation of antistatic coatings.

A ePTFE membrane as used in Example 1 was dipped in a mixture of 133.3 g Flemion F 950 in ethanol (6.0% solids, Ionomer, AGC), 216.7 g ethanol and 0.344 g sodium acetate (water free, 0.0042 mol) dissolved in 49.656 g water at 16° C. for 30 s (total time after complete wetting).

After drying at 160° C. for 5 min, the membrane was permeable to air (Frazier number 0.19) and showed a surface resistance of 67.35·10⁶ Ohm/square at 65% rh and 21° C. About 50% of the ionic groups were in the H-form.

A similar ePTFE membrane was dipped in a mixture of 133.3 g Flemion F 950 in ethanol (6.0% solids, Ionomer, AGC), 216.7 g ethanol and 0.412 g potassium acetate (water free, 0.0042 mol) dissolved in 49.588 g water at 16° C. for 30 s (total time after complete wetting).

After drying at 160° C. for 5 min, the membrane was permeable to air (Frazier number 0.10) and showed a surface resistance of 74.50·10⁶ Ohm/square at 65% rh and 21° C. About 50% of the ionic groups were in the H form.

Example 8

A flat cable for high flex and harsh environments from W.L. GORE GmbH (outer layer PTFE, GORE® HIGH FLEX Cable) was pretreated in an ultrasonic bath. After drying, the surface was additionally cleaned with methylethylketone.

The cable outer surface was exposed to an 6.0% by weight Flemion F 950 (FSS-1, AGC) solution in ethanol for 60 s.

After drying at 165° C. for 3 min, the surface resistance was measured. Both outer ePTFE sides of the cable showed a resistance between 3·10⁸ and 9·10⁸ Ohm/square at 21° C. and 55% relative humidity.

Example 9

In accordance with the procedure of Example 8, a planar cable configuration for high flex and harsh environments GSC-06-25743-00 AWM 21090 (W.L. GORE GmbH) was treated with Flemion F 950 (FSS-1, AGC) solution. The results shown in Table 1 represent the surface resistance measured at the coated flat cable configuration at 20° C. and 33% relative humidity.

TABLE 1

Planar cable surface properties GSC-06-25743-00 after antistatic treatment

| Sample | Surface resistance (Ohm/square)[0] | Surface resistance after flex test[1] (Ohm/square) | Surface resistance after temperature cycling[2] (Ohm/square) | Surface resistance after temperature cycling[3] (Ohm/square) |
|---|---|---|---|---|
| 1side A | 2.03 · 10⁷ | 5 · 10⁹-1 · 10¹⁰ | Not tested | Not tested |
| 1side B | 1.00 · 10⁷ | 1 · 10⁷-4 · 10⁸ | Not tested | Not tested |
| 2side A | 2.7 · 10⁷ | Not tested | 2.45 · 10⁸ | 1.258 · 10⁹ |
| 2side B | 2.57 · 10⁷ | Not tested | 3.25 · 10⁸ | 3.850 · 10⁹ |

[0]24° C. and 30% relative humidity
[1]number of flexes: 1,000,000
[2]cycle: Damp heat test
[3]cycle: Dry heat test As shown by the data in Examples 1 to 9, the use of ionic fluoropolymers mainly in its H form enhances antistatic properties at surfaces. Coatings were produced using different formulations of ionic fluoropolymers. Superior performance was achieved when the coatings were applied at ePTFE surfaces, such as membranes or flat cable configurations. All data represent an assessment of humidity dependence of surface resistivity for formulation selected from different equivalent weight of ionic fluoropolymers.

Fitness for use testing of antistatic coated cables under harsh environment showed excited durability performance of the coating.

The invention claimed is:

1. An antistatic article comprising:
    a porous polymeric substrate; and
    a monolithic coating including an ionic fluoropolymer in its H-form on said porous polymeric substrate,
    wherein said monolithic coating is airtight and prevents air flow through said antistatic article, and
    wherein said monolithic coating does not contain particles.

2. The article of claim 1, wherein said polymeric substrate is a fluoropolymer.

3. The article of claim 1, wherein said fluoropolymer is selected from polytetrafluoroethylene (PTFE) and expanded polytetrafluoroethylene (ePTFE).

4. The article of claim 3, wherein an F/H ratio of said ionic fluoropolymer is above 1.

5. The article of claim 1, wherein an equivalent weight of said ionic fluoropolymer ranges from about 500 g/mol to about 2000 g/mol.

6. The article of claim 1, wherein said ionic fluoropolymer is selected from a fluoroionomer and a fluoropolyether.

7. The article of claim 1, wherein at least 25% of the ionizable groups present in said ionic fluoropolymer are in said H-form.

8. The article of claim 1, wherein said article has a charge decay time at 20 percent relative humidity of less than about 2 seconds.

9. The article of claim 1, wherein said ionic fluoropolymer in its H-form is present in said coating in a concentration from 5 wt % to 0.5 wt % solids.

10. An antistatic article comprising:
a porous polymeric substrate comprising pores; and
a monolithic coating including an ionic fluoropolymer in its H-form on said porous polymeric substrate,
wherein said monolithic coating occludes pores in said porous substrate,
wherein said monolithic coating does not contain particles, and
wherein said monolithic coating is airtight and renders said antistatic article non-air permeable.

11. The article of claim 10, wherein said polymeric substrate is a fluoropolymer.

12. The article of claim 11, wherein said fluoropolymer is selected from polytetrafluoroethylene (PTFE) and expanded polytetrafluoroethylene (ePTFE).

13. The article of claim 10, wherein an equivalent weight of said ionic fluoropolymer ranges from about 500 g/mol to about 2,000 g/mol.

14. The article of claim 10, wherein said ionic fluoropolymer is selected from a fluoroionomer and a fluoropolyether.

15. The article of claim 10, wherein at least 25% of the ionizable groups present in said ionic fluoropolymer are in said H-form.

* * * * *